(12) United States Patent
Mollenauer (10) Patent No.: US 6,408,117 B1
(45) Date of Patent: Jun. 18, 2002

(54) MECHANICALLY INDUCED LONG PERIOD OPTICAL FIBER GRATINGS

(75) Inventor: Linn Frederick Mollenauer, Colts Neck, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/543,267

(22) Filed: Apr. 5, 2000

(51) Int. Cl.$^7$ .............................. G02B 6/34; H01S 3/00
(52) U.S. Cl. ............................. 385/37; 385/12; 385/13; 385/15; 385/31; 385/123; 359/341.1; 359/337.21
(58) Field of Search .............................. 385/12, 13, 15, 385/31, 32, 37, 123; 250/227.11; 359/341.1, 337.21

(56) References Cited

U.S. PATENT DOCUMENTS

| | | | |
|---|---|---|---|
| 4,449,210 A | 5/1984 | Myer | 367/149 |
| 4,459,477 A | * 7/1984 | Asawa et al. | 385/13 X |
| 4,530,078 A | * 7/1985 | Lagakos et al. | 385/13 X |
| 4,749,246 A | * 6/1988 | Epworth et al. | 385/13 X |
| 4,781,428 A | * 11/1988 | Epworth et al. | 385/37 X |
| 4,918,305 A | * 4/1990 | Wlodarczyk et al. | 385/13 X |
| 5,243,670 A | * 9/1993 | Bonicel | 385/13 |

FOREIGN PATENT DOCUMENTS

| | | | |
|---|---|---|---|
| EP | 0 286 350 A | 10/1988 | H04B/9/00 |
| GB | 2 188 719 A | 10/1987 | G02B/6/16 |

OTHER PUBLICATIONS

J. N. Blake et al, "Fiber–Optic Modal Coupler Using Periodic Microbending", *Optics Letters*, vol. 11, No. 3, Mar. 1986, pp. 177–179.

B. Y. Kim et al, "All–Fiber Acousto–Optic Frequency Shifter", *Optics Letters*, vol. 11, No. 6, Jun. 1986, pp. 389–391.

J. N. Blake et al, "Analysis of Intermodal Coupling In A Two–Mode Fiber With Periodic Microbends", *Optics Letters*, vol. 12, No. 4, Apr. 1987, pp. 281–283.

M. Tachibana et al, "Erbium–Doped Fiber Amplifier With Flattened Gain Spectrum", *IEEE Photonics Technology Letters*, vol. 3, No. 2, Feb. 1991, pp. 118–119.

A. M. Vengsarkar et al, "Long–Period Fiber Gratings as Band–Rejection Filters", *Journal of Lightwave Technology*, vol. 14, No. 1, Jan. 1996, pp. 58–64.

A. M. Vengsarkar et al, "Long–Period Fiber–Grating–Based Gain Equalizers", *Optics Letters*, vol. 1, No. 5, Mar. 1, 1996, pp. 336–338.

J. A. Rogers et al, "Using Microcontact Printing To Generate Amplitude Photomasks on the Surfaces of Optical Fibers: A Method for Producing In–Fiber Gratings", *Applied Physics Letters*, vol. 70, No. 1, Jan. 1997, pp. 7–9.

* cited by examiner

*Primary Examiner*—Brian Healy
(74) *Attorney, Agent, or Firm*—Barry H. Freedman; Jeffery J. Brosemer (57) ABSTRACT

By urging an ordinary single-mode (usually dispersion-shifted) fiber into an external, long period mechanical grating, a highly wavelength-selective coupling between the fiber's guiding mode and a cladding mode is induced. A sequence of such induced gratings, all on the same fiber, can be used to create a many tens of nm wide loss band of arbitrary shape, with resolution of 3 nm or better, whose strength at any wavelength can be continuously adjusted from zero to –17 dB or more. With its simplicity, nearly zero background loss, and especially, with its potential for continual readjustment, the device is ideal for dynamic gain equalization of optical amplifiers.

12 Claims, 12 Drawing Sheets

MECHANICALLY INDUCED LONG PERIOD OPTICAL FIBER GRATINGS

FIELD OF THE INVENTION

This invention relates generally to the field of optical communications and in particular to a method and apparatus for imparting long period gratings in an optical fiber.

BACKGROUND OF THE INVENTION

Long-period gratings can be used to provide a phase-matched coupling necessary to transfer power from one mode of an optical fiber to another. (See, e.g., J. N. Blake, B. Y. Kim and H. Shaw, "Fiber-Optic Modal Coupler Using Periodic Gratings," Opt. Lett. 11, 177(1986); J. N. Blake, B. Y. Kim, H. E. Egan, and H. J. Shaw, "All-Fiber Acusto-Optic Frequency Shifter," Opt. Lett. 11, 389(1986); and J. N. Blak, B. Y. Kim, H. E. Egan, and H. J. Shaw, "Analysis of Intermodal Coupling in a Two-Mode Fiber with Periodic Microbends," Opt. Lett. 12, 281(1987)). This has proven to be especially useful for coupling between a guiding mode and a cladding mode of ordinary transmission fibers, to create wavelength selective loss (See, e.g., M. Tachibana, R. I. Laming, P. R. Morkel and D. N. Payne, "Erbium-Doped Fiber Amplifier with Flattened Gain Spectrum," IEEE Phot. Tech. Lett. 3, 118(1991)).

Long-period gratings are typically written onto a fiber by exposing the fiber to the output of a KrF excimer laser ($\lambda$=248 nm) through an amplitude mask (See, e.g., A. M. Vengsarkar, P. J. Lemaire, J. B. Judkins, T. Erdogan, and J. E. Sipe, "Long-Period Fiber Gratings as Band-Rejection Filters," J. Lightwave Tech., 14, 58(1996); A. M. Vengsarkar, J. R. Pedrazzani, J. B. Judkins, P. J. Lemaire, N. S. Bergano, and C. R. Davidson, "Long-Period Fiber-Grating-Based Gain Equalizers," Opt. Lett., 21, 336(1996); and J. A. Rodgers, R. J. Jackman, G. M. Whitesides, J. L. Wagener, and A. M. Vengsarkar, "Using Microcontact Printing to Generate Amplitude Photomasks on the Surfaces of Optical Fibers: A Method for Producing In-Fiber Gratings," Appl. Phys. Lett. 70,7(1997)). A serious drawback of such laser-written gratings however, is that they are permanent. As a result, once written, their strength (and hence the depth of the loss) is no longer adjustable. Additionally, since the gratings tend to be relatively short (~25 mm), the resultant absorption band or resonance is fairly wide, typically >10 nm between the points (henceforth known as the "FWHdB" points) where the logarithm of the loss is half that at the peak.

As a result of these and other drawbacks to the prior art, a continuing need exists for improved methods and apparatus that produce long-period gratings in optical fibers.

SUMMARY OF THE INVENTION

I have developed a method for inducing long period gratings into an optical fiber mechanically, so that the strength of the resultant resonance can be adjusted continuously (and reversibly) from zero. Briefly stated, my method for inducing gratings into an optical fiber involves gently pressing the optical fiber into a ruled mechanical grating with a rubber or other elastic pad such that a series of "microbends" are produced.

Advantageously, my method is both convenient and produces superior results. In particular, gratings constructed according to my method can be long (typically 75–100 mm), and exhibit narrow resonances (typically $\geq$3 nm between the FWHdB points) suitable for high resolution correction of erbium amplifier gain curves. Furthermore, if the fiber used for my method is overcoated with a special low-index (n<1.4) plastic, there is no need to strip off the coating thereby preserving the strength and durability of the fibers while at the same time, producing gratings that are exceptionally simple and inexpensive to fabricate.

Furthermore, my method also allows one to compensate for random variations in the fiber, which otherwise may produce a small but significant scattering in the resonance wavelengths produced by a particular grating period. Finally, a device constructed according to my method is amenable to electro-mechanical control, since the forces and displacements required to induce the gratings are well within the capability of well-known transducers.

Viewed from one aspect, my invention is directed to the method for producing mechanically induced long period gratings from an optical fiber. Viewed from another aspect, my invention is directed to the long period grating mechanically induced into the optical fiber as taught and described herein.

DETAILED DESCRIPTION OF THE INVENTION

Figure 1:
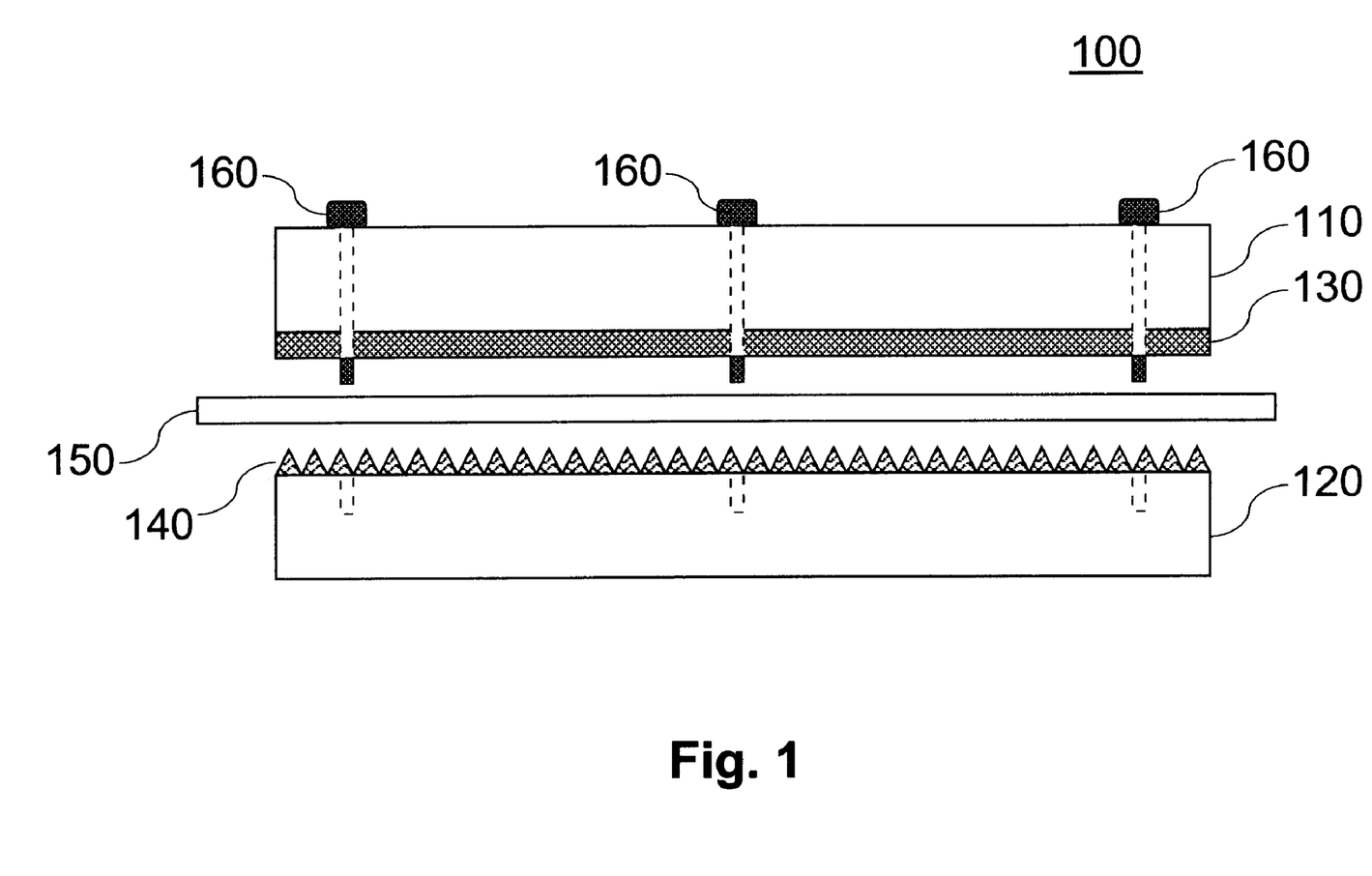
FIG. 1 is a schematic drawing illustrating the principles of the present invention.

With reference now to FIG. 1, there is shown a schematic drawing of an apparatus constructed according to the principles of the present invention. Specifically, and in its simplest form, apparatus 100 includes an optical fiber 150 interposed between, an overlying plate 110, an underlying plate or substrate 120 which includes a ruled, mechanical grating 140, and one or more fixing/adjustment screws 160. As can be appreciated, with the optical fiber interposed between the ruled grating 140 of the substrate 120 and the overlying plate 110, and the two plates are brought together, the optical fiber 150 becomes "pinched" between the two and becomes deformed where it contacts the ruled grating 140. Through the action of this series of deformations or "microbends", a mechanically induced, long-period grating is constructed from the optical fiber.

At this point, it is important to note that although I have shown one or more fixing/adjustment screws in this exemplary embodiment, any of a variety of known mechanical/electromechanical/piezoelectric adjustment devices may be used. All that is required, is that the device imparts sufficient force to induce the grating into the optical fiber 150 when it is sandwiched between the overlying plate 110 and the underlying plate substrate 120.

With continued reference to FIG. 1, pad 130, constructed from any of a variety of materials, provides an elastic interface between optical fiber 150 and overlying plate 110. As can be readily appreciated, the pad 130 imparts additional "tunability", that is, the ability for a long-period grating constructed according to my teachings to be changed or "tuned" as appropriate to a given application. And while I have made extensive use of elastic materials such as rubber, any deformable material may be used although they may not be as reusable or tunable as their more elastic counterparts.

Figure 1A:
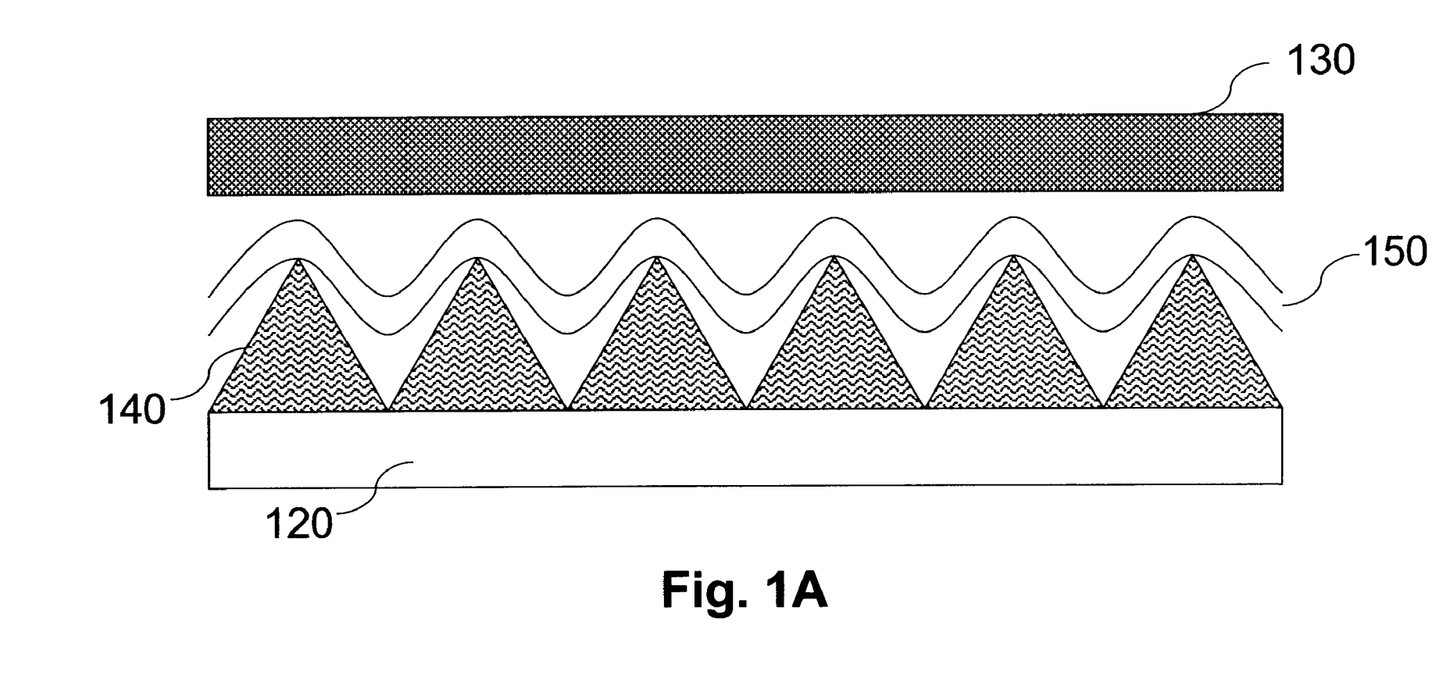
FIG. 1A is a schematic drawing showing a close-up view of an optical fiber, ruled grating, substrate and elastic pad of FIG. 1.

Turning our attention now to FIG. 1A, there is shown an exploded, close up view of the pad 130, optical fiber 150, ruled mechanical grating 140 and substrate 120. Shown in this Figure are the microbends 155 of the optical fiber 150 which occur primarily in those regions of the optical fiber 150 which contact the "peaks" and "troughs" of the ruled mechanical grating 140. And while not explicitly shown in this Figure, those skilled in the art will recognize that the pad 130 will likewise deform in areas that correspond to the peaks and troughs of the ruled mechanical grating 140 as the pad 130 and substrate 120/ruled mechanical grating 140 are pressed or urged towards one another, sandwiching the optical fiber 150 between them.

Additionally, while I have only shown a ruled mechanical grating 150 that appears to have a triangular shaped cross section in the exemplary Figure, it is assumed that any shape may be used provided that a satisfactory, mechanically induced long period grating is imparted in the optical fiber 150.

Figure 1B:
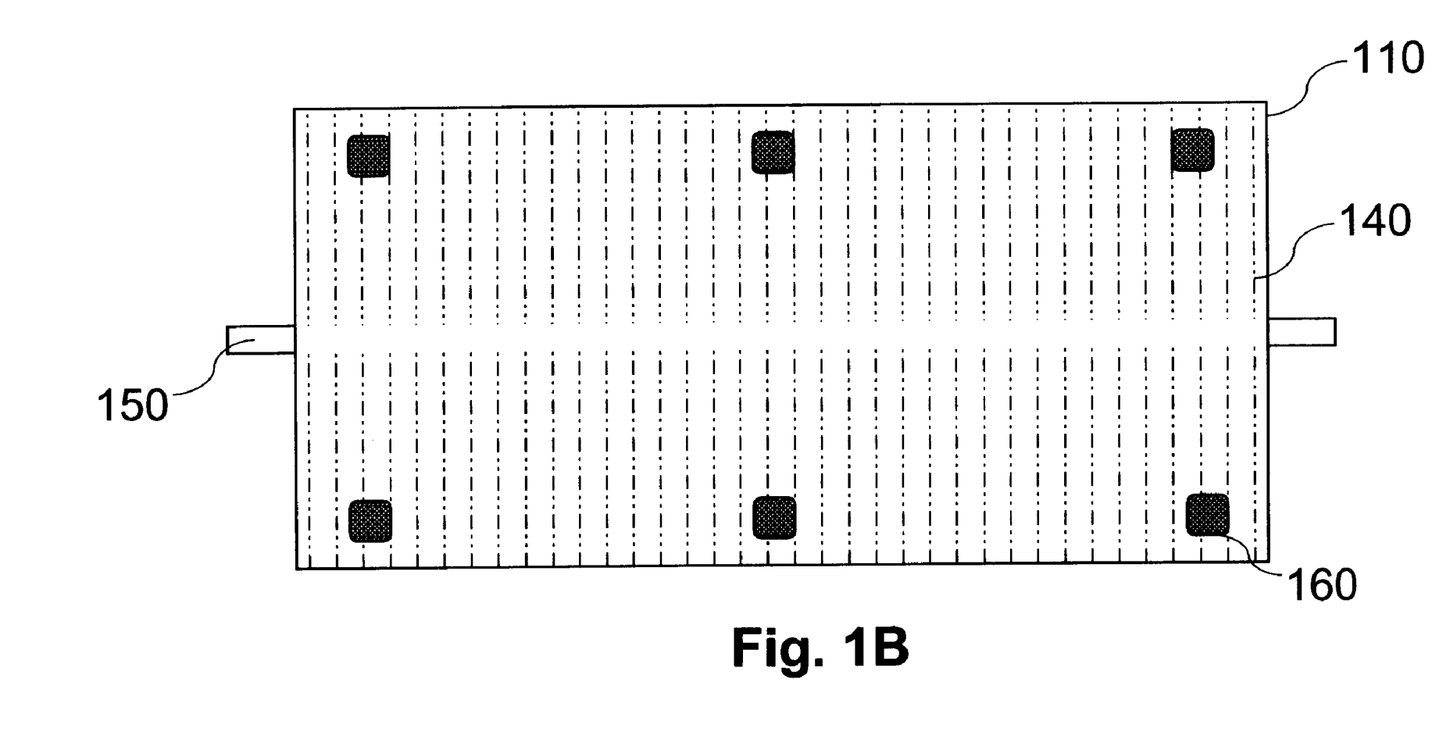
FIG. 1B is an overhead view of the schematic drawing of FIG. 1.

Lastly, I continue my introductory discussion with reference to FIG. 1B, which shows an overhead view of an assembly which imparts mechanically induced long period gratings into optical fiber 150.

By way of further background, if we assume that a grating supports an optical fiber only at points separated by its period, $\lambda_g$, then simple beam bending theory tells us that the vertical deflection of the fiber, y(z), is proportional to the quantity $-z^2(\lambda_g-z)^2$, which is nearly sinusoidal over the space of one grating period (for $0 \leq z \leq \lambda_g$). The maximum deflection (at the center of the grating period) is given by:

$$y_{max} = \frac{w\lambda_g^4}{384EI}; \quad (1)$$

where w is the force per unit length along the fiber, E is Young's modulus ($E=7.3\times10^4$ N/roman mm$^2$ for fused silica), and $I=\pi d^4/64$—the moment of inertial of the fiber about its diameter d (usually=0.125 mm).

To appreciate typical magnitudes of these quantities, consider a situation in which w=0.53 N/mm produced a 1 dB deep resonance in a dispersion-shifted fiber stretched across a 75 mm long grating of $\lambda_g$=0.41 mm. In this situation, Eq. (1) yields $y_{max}$=45 nm. As will be shown the deflections required for deep resonances are only a few times that value, consequently it is readily apparent that both the required forces and deflections are quite modest.

As can be appreciated, sinusoidal microbending of the fiber causes coupling between the fundamental mode ($LP_{01}$) and various odd symmetry modes. From the solution to the coupling equations, the energy or power transmission of the resonance is expected to be:

$$T(k,\delta) = 1 - \frac{\sin^2\left[kL\sqrt{1+(\delta/k)^2}\right]}{1+(\delta/k)^2}; \quad (2)$$

where $\delta$ is the detuning parameter given by:

$$\delta = \frac{1}{2}[k_{01}(\lambda)-k_{cl}(\lambda)-2\pi/\lambda_g], \quad (2a)$$

Figure 2:
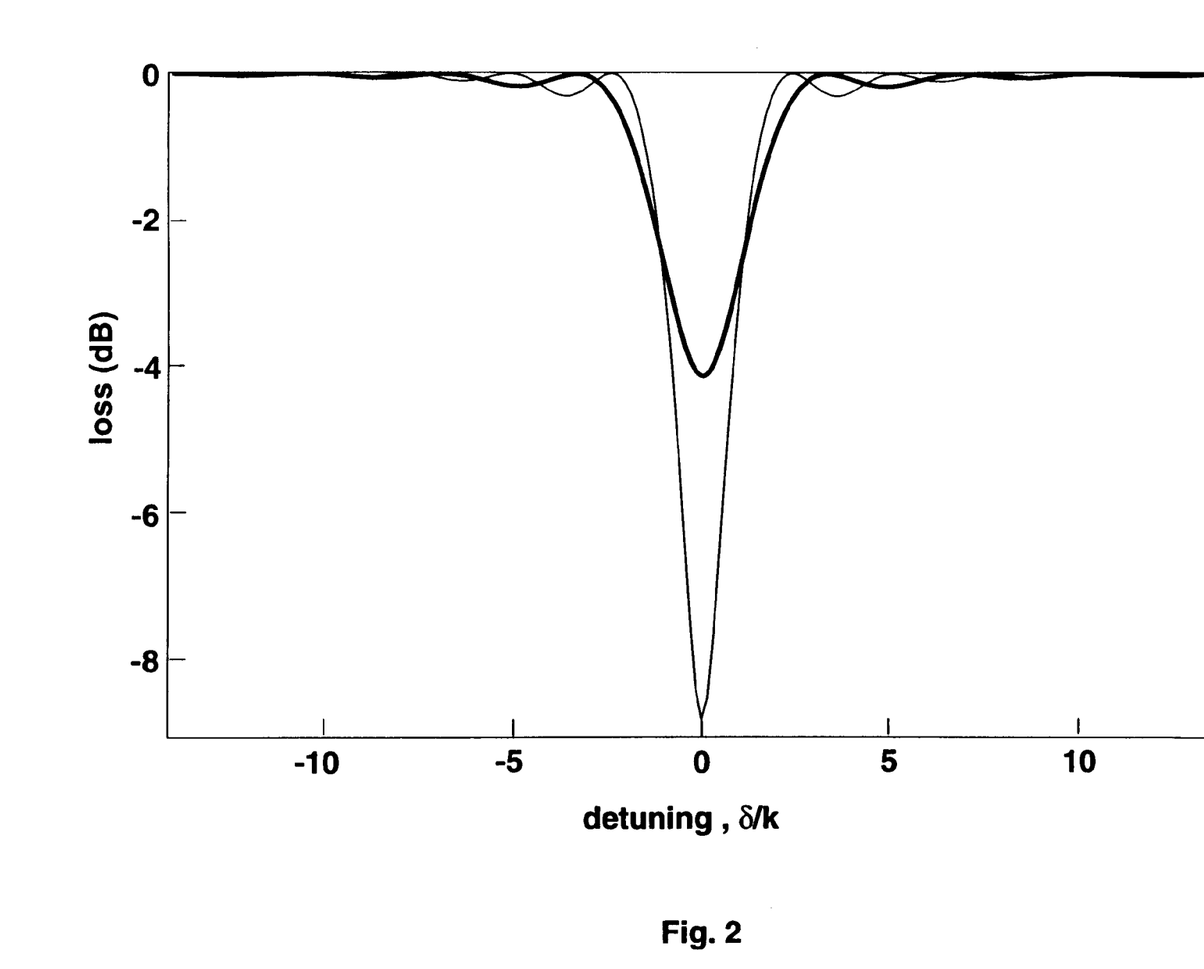
FIG. 2 is a graph showing $T(\delta)$, for two different values of k.

L is the grating length, and $k_{01}$ and $k_{cl}$ are the wave vectors of the $LP_{01}$ and cladding modes, respectively. FIG. 2 graphically shows $T(\delta)$, for two different values of k.

It has been shown that the coupling coefficient between the $LP_{01}$ and $LP_{11}$ modes is essentially $K \approx y_{max}/d_{eff}$, where $d_{eff}$ is the effective core diameter of the fiber. It is interesting to note that if we use this formula to calculate k for the numerical example cited above (where we had $y_{max}$=45 nm in dispersion shifted to fiber with ($d_{eff} \approx \mu$m)), Eq. (2) yields a transmission loss of about 1 dB.

In connection with this, it should be noted that when we scan over a band that is several hundreds of nanometers wide, we tend to see several transitions, having monotonically decreasing strengths and spacings as the wavelength decreases. In particular, when ordinary DS fiber is used, as many as five resonances are observed, viz., for a grating period of 397 $\mu$m, at 1636, 1519, 1452, 1415, and ~1358 nm, respectively. When a low index, plastic jacketed fiber such as TRUE WAVE is used however, we tend to see just two resonances—the second one (the one not used) being much weaker and typically about 125 nm shorter in wavelength.

It is important to note that it is oftentimes difficult to obtain deep, sharp resonances when the fiber is coated with the usual high index (n~1.5) plastic. In that case, the cladding mode extends far into the plastic, whose high loss rate tends to prevent the rapid build up of a large field over the length of the grating (as required for a strong resonance). Direct contact between a bare fiber and the rubber or other elastic pad produces the same result.

In order to fully appreciate the simplicity of my method, when first obtaining sharp resonances from devices constructed according to my method, a thin layer of aluminum foil or teflon tape (n=1.36) was used to optically separate a bare fiber optically from a pad. Since bare fibers are notoriously delicate, I also used fibers stripped of their plastic jackets and completely overcoated with metal in the region of the grating. The metal overcoating was performed by a simple, yet tedious electroless process. Although these metalized fibers yielded resonances virtually identical to those obtained with bare fiber, their strength and durability were still unsatisfactory.

The solution to this problem, as I have already noted, is to use fibers overcoated with a low index plastic (jacketed), so that the cladding mode fields remain entirely confined to the glass cladding itself. The overcoated fibers yield resonances just as deep and as sharp as with bare fiber, and because the overcoating remains intact, the fibers remain strong and durable.

Figure 3:
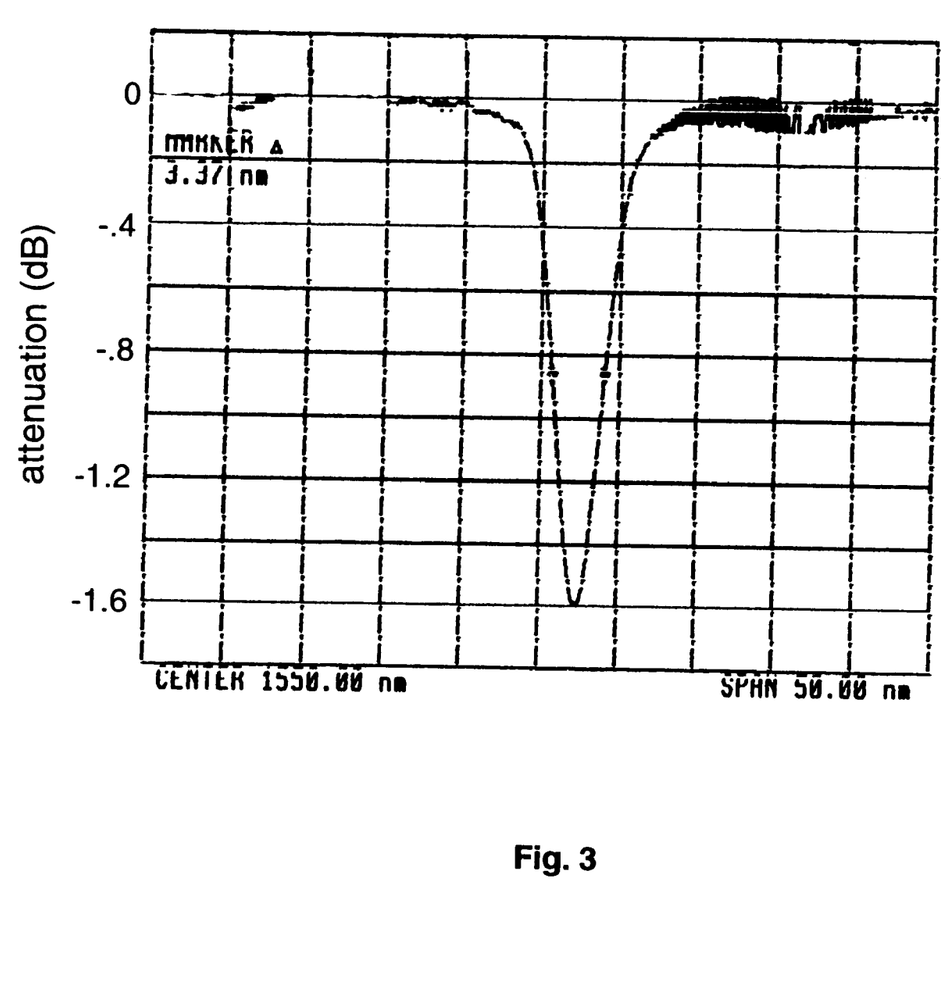
FIG. 3 is a graph showing experimentally observed resonances.
Figure 4:
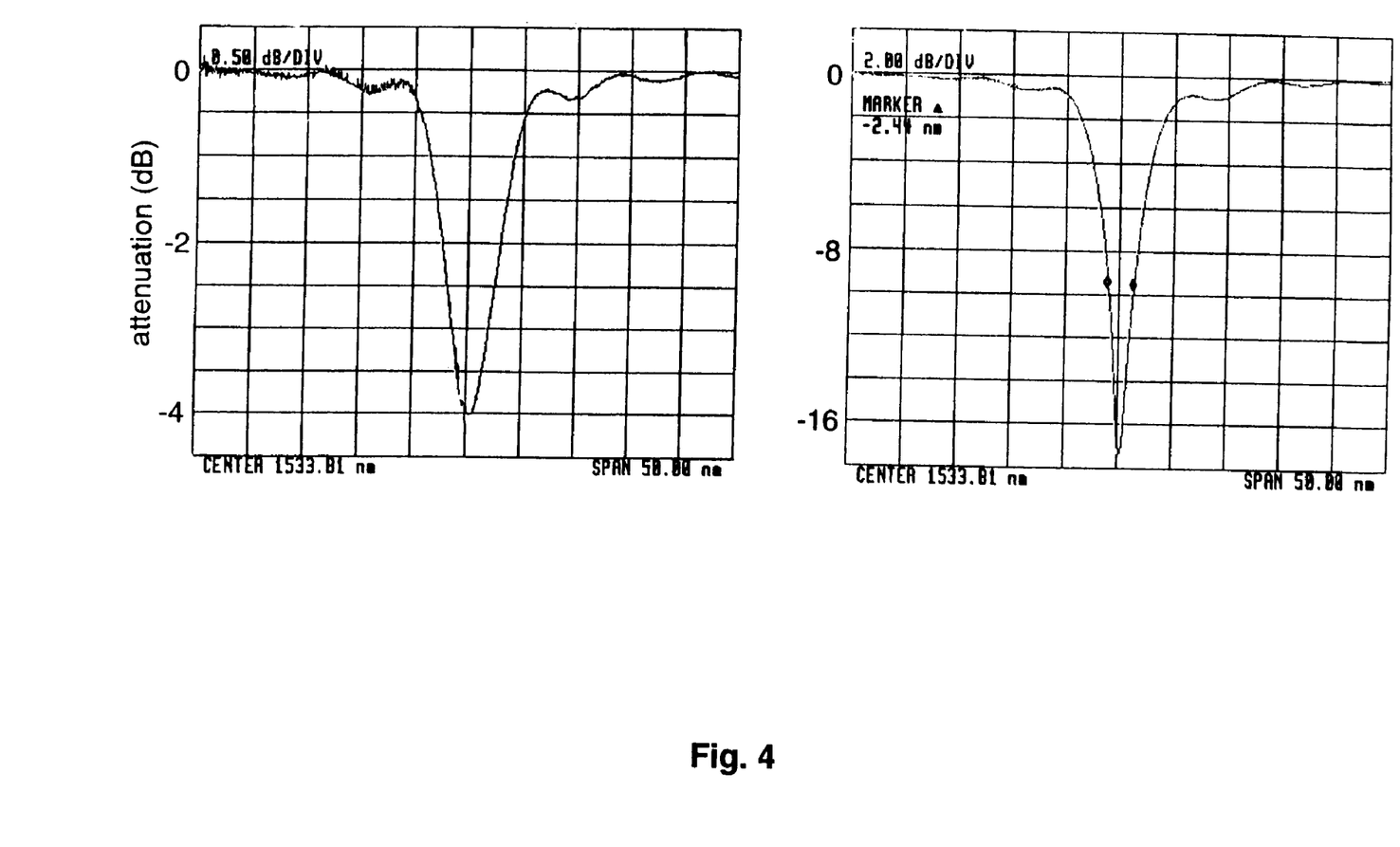
FIG. 4 is a graph showing experimentally observed resonances.

With simultaneous reference now to FIGS. 3 and 4, the experimentally observed resonances tend to have all the features predicted by Eq. (2). In particular, they tend to have a clean, symmetrical shape, with narrow skirts and virtually zero "background" loss, except for a few weak side lobes. With continued reference now to FIG. 4, there it shows typical behavior with increasing depth. Note in particular that the resonances tend to become sharper as they become very deep, just as in the theoretical curves of FIG. 2. With even greater pressure than used to produce the graph in FIG. 4, the absorption peak stops growing and becomes smaller again, also as predicted by Eq. (2). This likely happens because, once most of the energy is transferred to the cladding mode over the first half of the grating, in the second half it is transferred back to the main mode.

Finally, it should be noted that no detectable shift in resonance wavelength is observed with increasing depth; which is in direct contrast to the behavior of the photo-written gratings, where a very large shift in resonance with increasing grating strength creates a problem for repeatable filter manufacture. In any case, such a coupling between resonance depth and wavelength would be intolerable for the operation of a device such as a dynamic gain equalizer.

Figure 5:
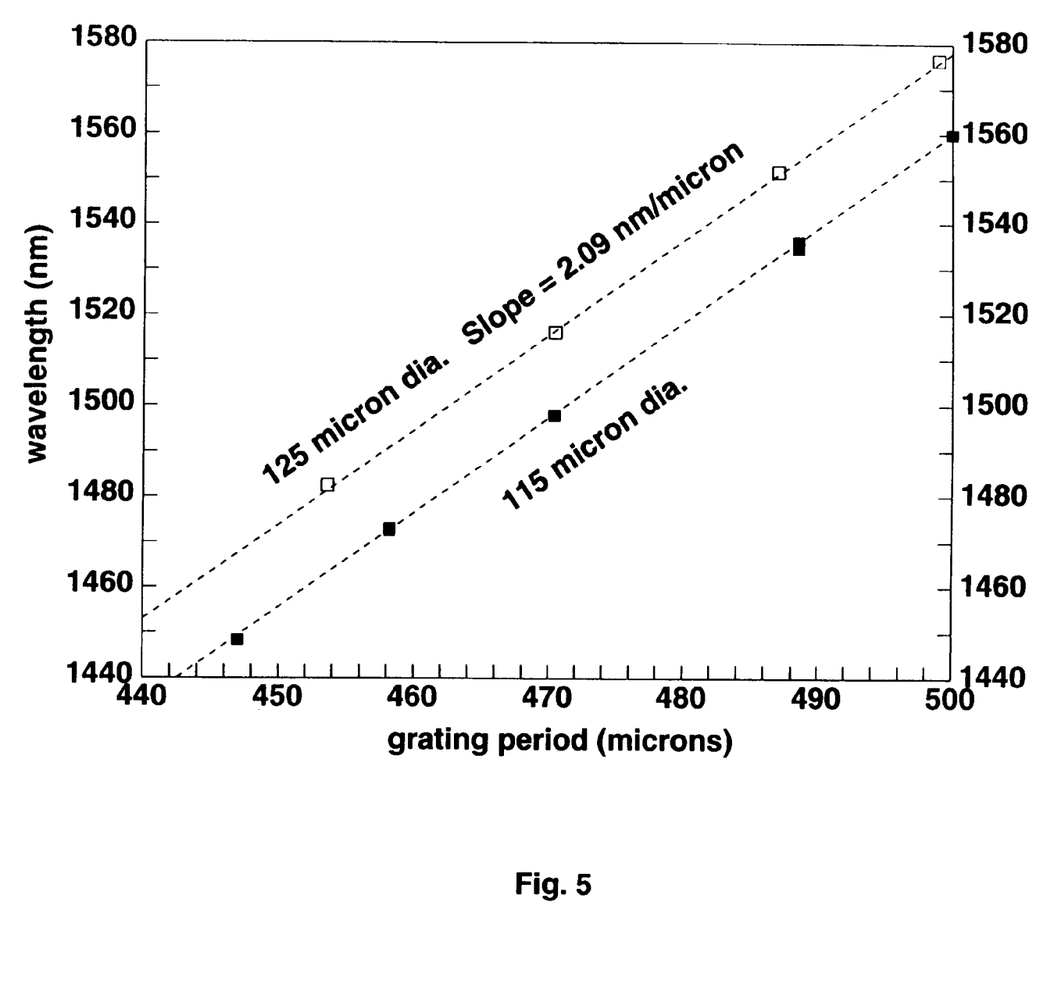
FIG. 5 is a graph of wavelength vs grating period.

With reference now to FIG. 5, it can be seen that the resonance wavelengths tend to show an almost perfectly linear dependence on the grating period ($\lambda_g$), with a slope of about 2 nm/$\mu$m, when the latest TRUE WAVE fibers are used. This dependence implies a nearly linear behavior of the quantity $k_{01}-k_{cl}$ on $\lambda$. The absolute grating period required for a given resonance wavelength varies from fiber to fiber, however. For some of the older dispersion shifted fiber types that were initially used, for example, the grating periods required for a 1550 nm resonance tended to lie closer to 400 $\mu$m than to the values shown in FIG. 5. But even within an ostensibly constant fiber type, however, experience shows that both the fiber's diameter and preform irregularities must be tightly controlled in order to have an accurately repeatable relation between resonance wavelength and grating period.

Figure 6:
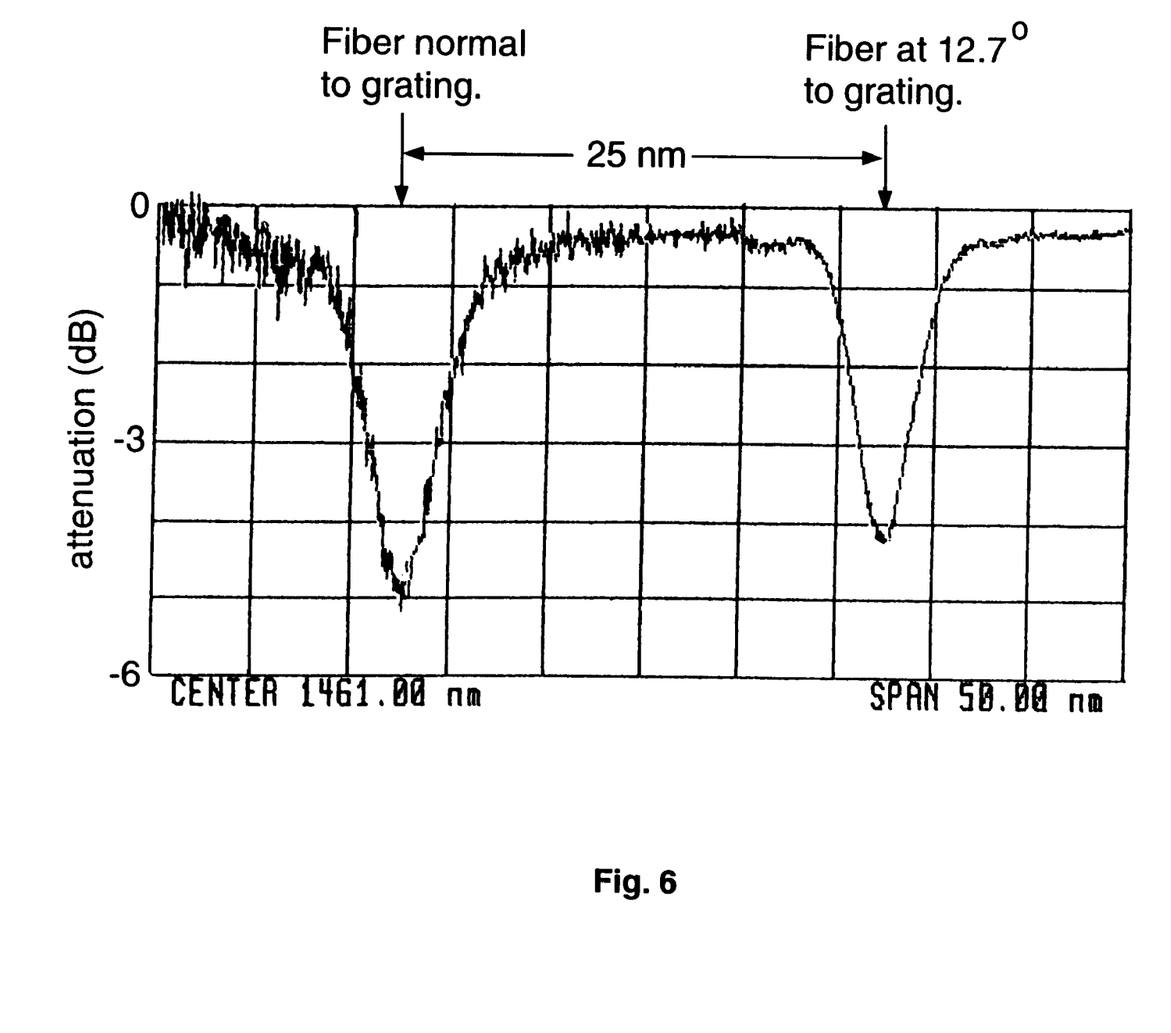
FIG. 6 is a graph showing resonance peaks for fiber normal to grating and fiber biased at 12.7 degrees to grating.
Figure 7:
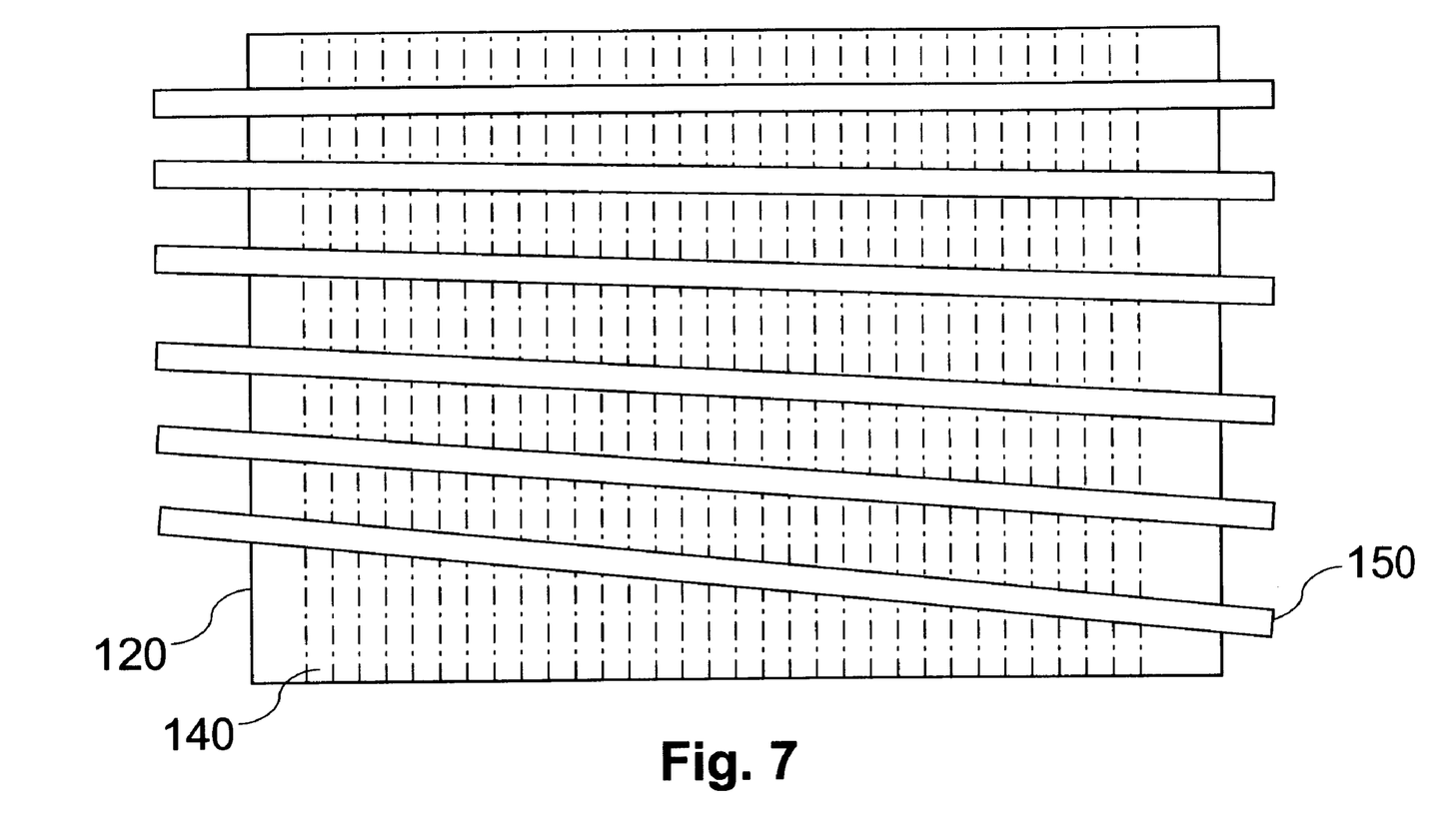
FIG. 7 is a schematic drawing of the arrangement shown in FIG. 1 showing the optical fibers placed at an angle relative to the ruled grating.
Figure 8:
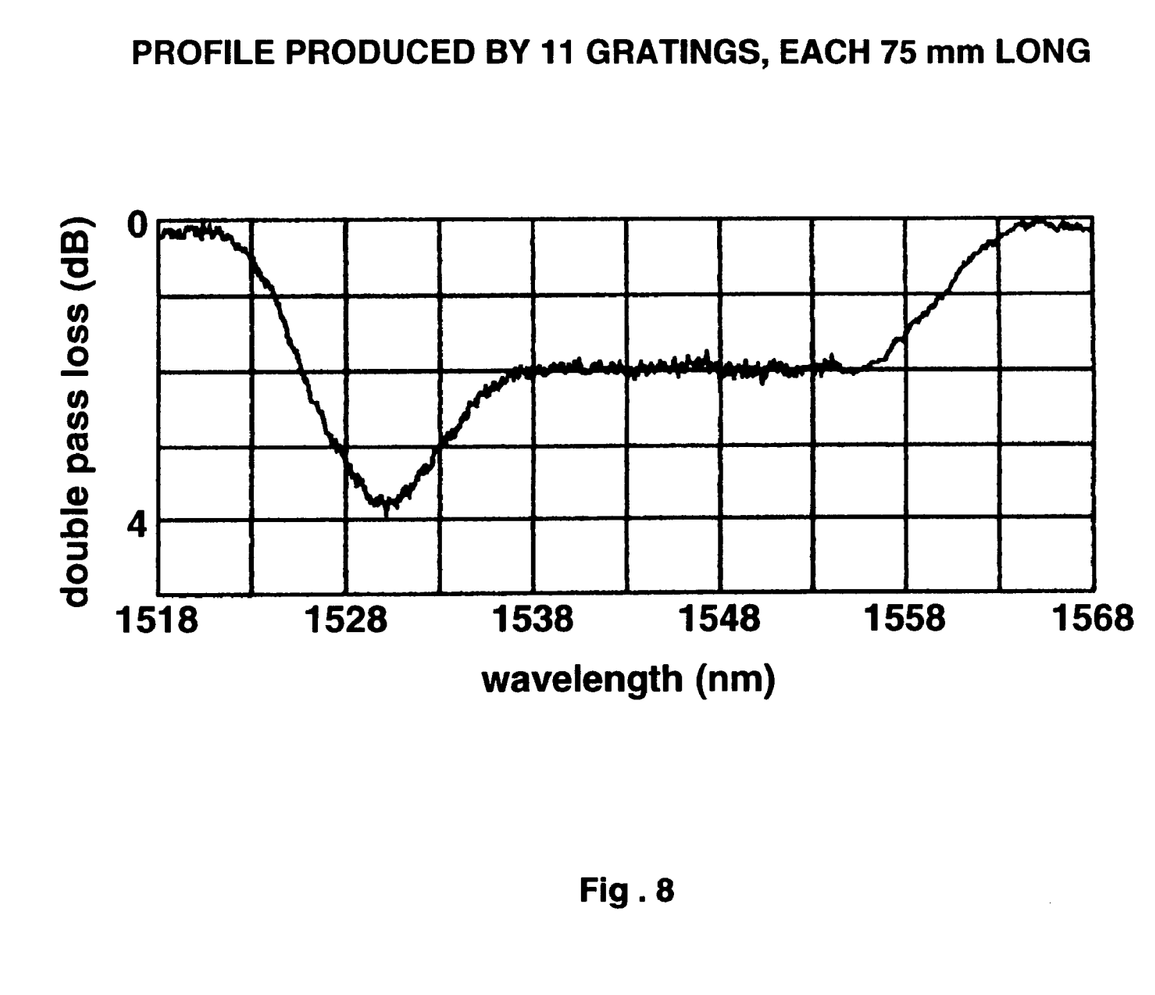
FIG. 8 shows exemplary resonances for a device constructed as in FIG. 7.

One convenient way of tuning the resonance wavelengths is by aligning the fiber at an angle, $\theta$ with respect to the normal to the grating grooves, since, in that case, one obviously has an effective grating period $\lambda_{eff}=\lambda_g/\cos(\theta)$. With reference now to FIG. 6, there is shown an example of such angle tuning, where the fiber has been first aligned normally for one pass over the grating grooves, and then at 12.7° to that alignment for the second pass. Clearly, by providing for a number of passes of the fiber over a grating at successively increasing angles, one can make a device yielding a uniformly spaced set of resonance wavelengths as shown in FIG. 7. If the spacing is no more than the FWHdB width of the individual resonances, the net loss band can have just about any arbitrary smooth shape, created by adjustment of the strengths of all the individual resonances. FIG. 8 shows an example so produced by 11 gratings, each 75 mm long.

As an alternative to angle tuning, pressure bars or steel beams, could be employed each containing gratings, of successively increasing period from one bar to the next, in their lower edges. These slender (just a few mm wide), comb-like bars would then press directly into the fiber, which would in turn lie on the rubber pad. This scheme might be especially attractive if the grating bars were reproduced cheaply by molding or stamping from a thermally and mechanically stable plastic material. By having a large number of such grating bars arranged according to their periods, one could quickly make up a set to satisfy just about any custom requirement. The range of grating periods would also facilitate accommodation to wandering fiber characteristics.

It should be understood that although the energy coupled into the cladding mode must remain with that mode over the length of the grating, it must subsequently be dissipated through bending loss. When the fiber outside the grating region is coated with high index plastic, the required loss is obtained in a few centimeters path of slightly bent fiber. With the low index plastic coated fibers, however, much greater length is required to effect the necessary loss. As can be readily appreciated, that is because with the low index coating, the glass cladding remains a fairly good guide, and the cladding mode experiences little loss from the plastic.

Figure 9:
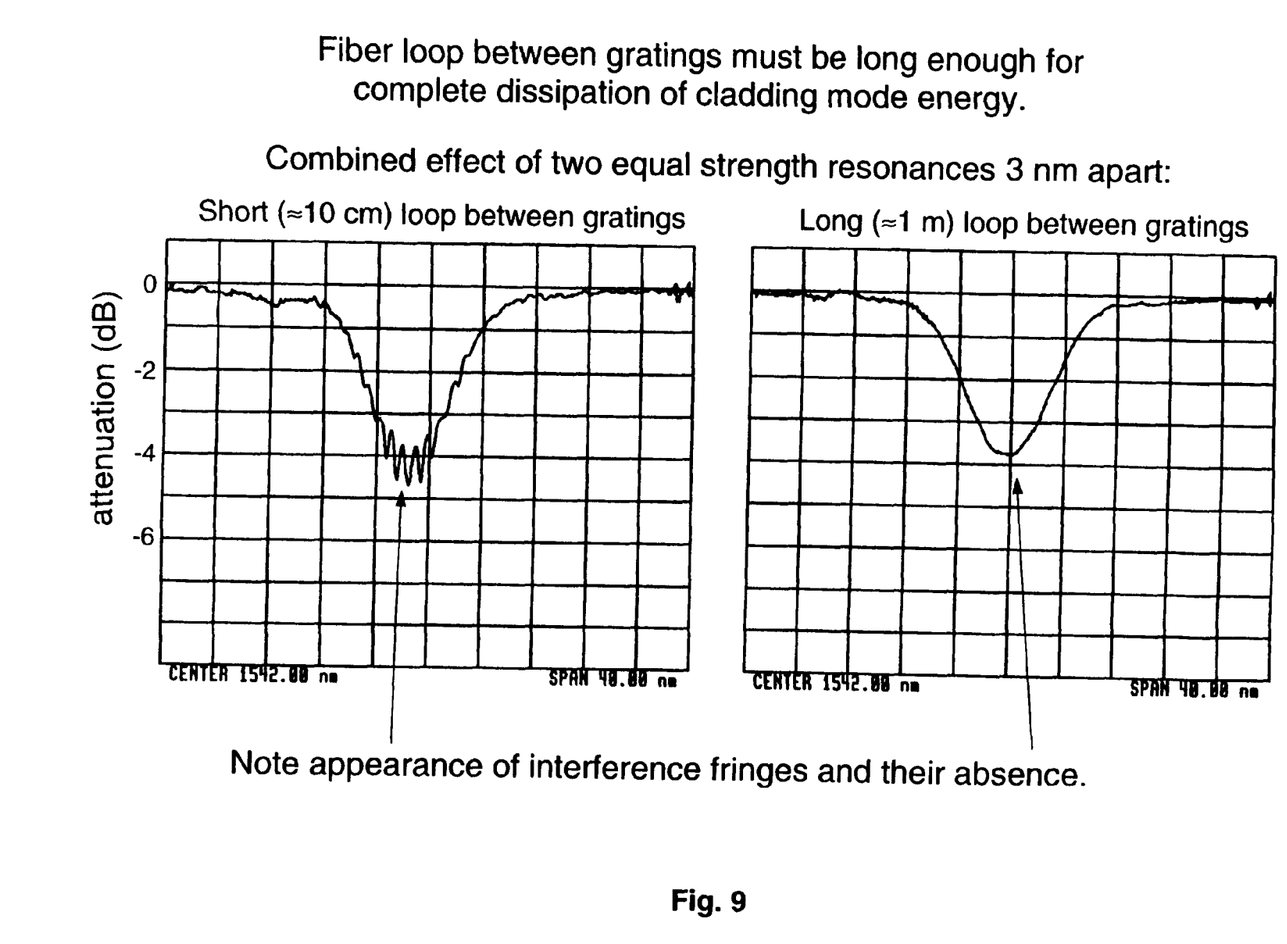
FIG. 9 is is a set of graphs showing the combined effects of two equal strength resonances positioned 3 m apart.

With reference now to FIG. 9, there the left hand side of the figure shows the interference fringes obtained from two partially overlapping resonances, when a short (approx 10 cm) loop was used between the two gratings. The interference fringes show that a small but significant fraction of the cladding mode field from the first grating was still present in the region of the second grating. To completely eliminate the fringes, it is only necessary to use a much longer fiber loop (approx 1 m) between gratings, as shown in the right hand side of FIG. 9, or alternatively, to re-coat the bends with a high n fiber.

Figure 10:
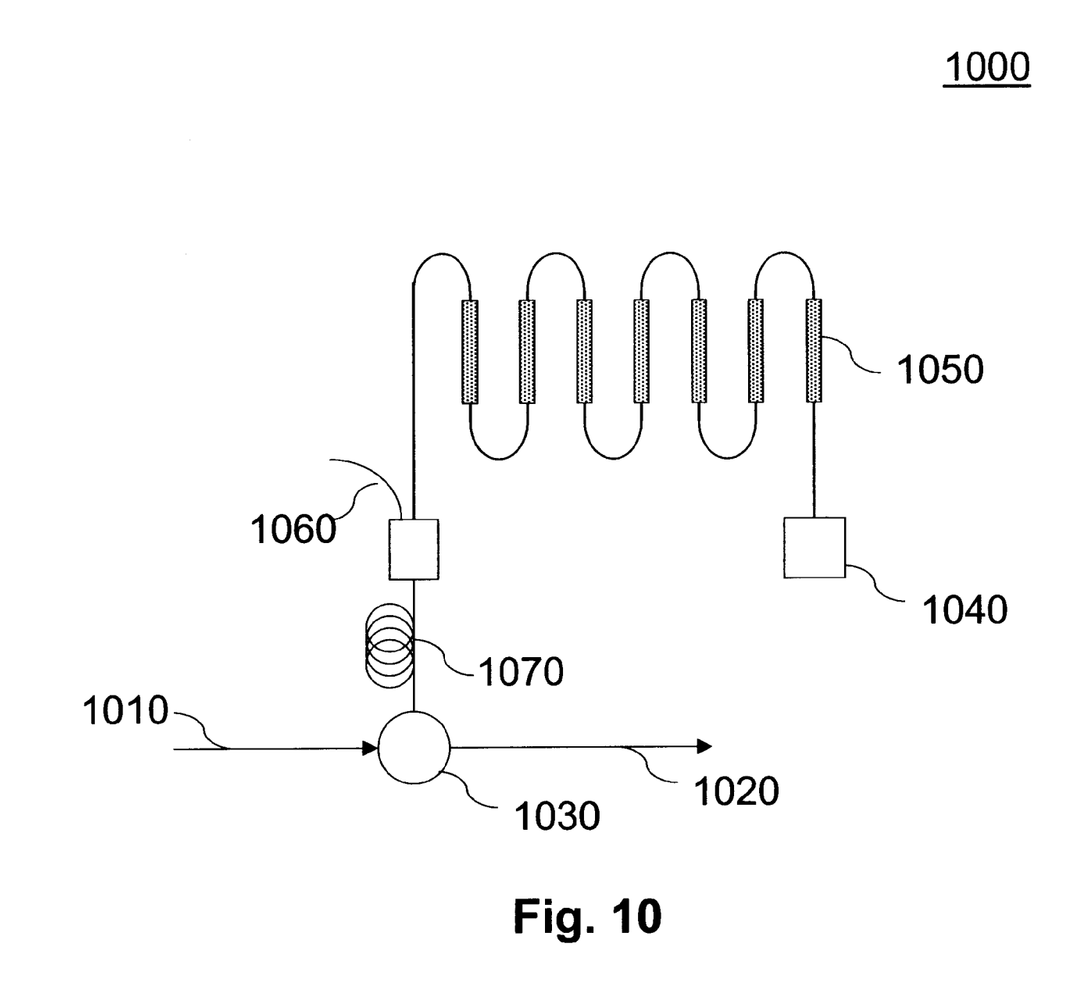
FIG. 10 is a schematic drawing of a fiber amplifier including the invention of the present application.

The most serious defect of the resonances is that they tend to suffer a slight polarization-dependent splitting. The origin of this splitting is not known, but one can speculate that it may be related to deviatioris from perfect cylindrical symmetry, as for example would be produced by an off-center core, or to a mild birefringence induced by the pressure on the fiber, or to a combination of these effects. In any event, the splitting in turn results in a polarization-dependent loss (PDL), which is greatest on the sides of the resonance, and typically amounts (in dB) to about 5–10% of the peak dB loss. Although "small", that amount of PDL is nevertheless intolerable in many applications. Fortunately, there is a simple way to completely eliminate the net POL, and that is to use the grating device in double pass, between a circulator and a Faraday mirror. With reference now to FIG. 10 there is shown an example of such a configuration, invoked as an integral part of an erbium fiber amplifier 1000. Specifically, the amplifier 1000 shown there includes circulator 1020, faraday mirror 1040, pump 1060, erbium-doped fiber 1070 and one or more gratings 1050 constructed according to the present invention. As can be appreciated, incoming optical signals 1010 are routed by the circulator 1030 through the grating 1050 to the faraday mirror 1040, then passed again through the grating 1050, and amplified through the action of pump 1060 in conjunction with erbium-doped fiber 1070. The amplified optical signals are then output through the action of circulator 1030 as amplified output signals 1020. The PDL is eliminated because of the fact that, due to the Faraday mirror, to the polarization state at every point along the return path is exactly orthogonal to the same along the incoming path. Note that this configuration also tends to eliminate any PDL arising from the erbium amplifier fiber itself.

Various additional modifications of this invention will occur to those skilled in the art. Nevertheless, all deviations from the specific teachings of this specification that basically rely upon the principles and their equivalents through which the art has been advanced are properly considered within the scope of the invention as described and claimed

What is claimed is:

1. A method of inducing a grating in an optical fiber comprising the steps of:
   mechanically deforming said fiber by urging it into a ruled mechanical grating,
   wherein said mechanically deforming step further comprises the steps of:
   disposing the optical fiber between a pad and the ruled mechanical grating; and
   urging the mechanical grating and the pad together, and wherein said pad comprises rubber or other suitably elastic material.

2. An optical apparatus comprising:

a ruled mechanical grating;

a pad; and an optical fiber, interposed between the ruled mechanical grating and the pad such that when the pad and the grating are urged together, a grating is imparted into the optical fiber, and further comprising one or more adjusters, for adjustably urging the pad and the grating together, wherein said pad comprises rubber or other suitable elastic material.

3. An optical apparatus comprising:

a ruled mechanical grating;

a pad; and an optical fiber, interposed between the ruled mechanical grating and the pad such that when the pad and the grating are urged together, a grating is imparted into the optical fiber, further comprising one or more adjusters, for adjustably urging the pad and the grating together, and further comprising an underlying plate, on which is disposed the grating.

4. The apparatus according to claim 3 further comprising:

an overlying plate, on which is disposed the pad.

5. An optical apparatus comprising:

a ruled mechanical grating;

a pad; and an optical fiber, interposed between the ruled mechanical grating and the pad such that when the pad and the grating are urged together, a grating is imparted into the optical fiber, further comprising one or more adjusters, for adjustably urging the pad and the grating together, wherein the adjusters comprise one or more adjustment screws which adjustably fix the overlying plate to the underlying plate.

6. An optical apparatus comprising:

a ruled mechanical grating;

a pressure bar; and an optical fiber, interposed between the pressure bar and the grating such that when the pressure bar and the mechanical grating are urged together, the pressure bar substantially overlies the optical fiber and imparts a series of microbends in that fiber as a result of the fiber being urged into the grating, further comprising a means for adjusting the force with which the pressure bar and the grating are urged together;

an overlying plate, overlying the pressure bar; and an underlying plate, underlying the grating.

7. An optical apparatus comprising a rare-earth doped fiber amplifier CHARACTERIZED IN THAT:

optical signals at least twice traverse an adjustable, long period grating, a rare-earth doped fiber amplifier such that polarization-dependent loss is substantially reduced.

8. The optical apparatus according to claim 7 wherein said adjustable, long period grating comprises:

a pad;

a mechanical grating;

an adjustor, for adjustably urging the mechanical grating and the pad together; and an optical fiber interposed between the pad and the grating.

9. The apparatus according to claim 8 wherein the optical fiber is disposed between the pad and the grating at angle relative to a normal of the grating.

10. The apparatus according to claim 9, wherein said pad consists essentially of rubber or other substantially elastic material.

11. An optical array comprising:

an array of mechanically induced optical gratings wherein an output of a preceding grating is input to a succeeding grating, wherein an individual one of said array of mechanically induced optical gratings includes:

a pad;

a mechanical grating;

an adjuster, for adjustably urging the mechanical grating and the pad together; and an optical fiber interposed between the pad and the grating, wherein said pad comprises rubber or other suitably elastic material.

12. The optical apparatus according to claim 11 wherein said fiber is positioned between the pad and the mechanical grating at an angle relative to grating grooves.

\* \* \* \* \*